United States Patent
Yoshida

(10) Patent No.: US 12,481,958 B2
(45) Date of Patent: Nov. 25, 2025

(54) DATA UPDATING METHOD AND STORAGE MEDIUM

(71) Applicant: TOYOTA JIDOSHA KABUSHIKI KAISHA, Toyota (JP)

(72) Inventor: Nobuhiro Yoshida, Aichi-ken (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 167 days.

(21) Appl. No.: 18/484,672

(22) Filed: Oct. 11, 2023

(65) Prior Publication Data

US 2024/0193541 A1 Jun. 13, 2024

(30) Foreign Application Priority Data

Dec. 7, 2022 (JP) ................................ 2022-195452

(51) Int. Cl.
G06Q 10/087 (2023.01)
G06Q 10/10 (2023.01)

(52) U.S. Cl.
CPC .................................. G06Q 10/087 (2013.01)

(58) Field of Classification Search
CPC ... G06Q 10/087; G06Q 10/0838; G06F 16/23
USPC .......................................................... 705/29
See application file for complete search history.

(56) References Cited

U.S. PATENT DOCUMENTS

| | | | |
|---|---|---|---|
| 9,760,854 B1* | 9/2017 | Chowdhary | G06Q 30/0621 |
| 11,321,767 B1* | 5/2022 | Myers | G06Q 10/0832 |
| 2010/0268748 A1* | 10/2010 | Wang | G06Q 10/087 707/803 |
| 2011/0218886 A1* | 9/2011 | Matsuoka | G06Q 30/0641 705/27.1 |
| 2019/0043015 A1* | 2/2019 | Nakano | G06Q 10/08355 |

FOREIGN PATENT DOCUMENTS

JP  H05-040791 A  2/1993

OTHER PUBLICATIONS

U.S. Appl. No. 18/447,546, filed Aug. 10, 2023.

\* cited by examiner

*Primary Examiner* — Garcia Ade
(74) *Attorney, Agent, or Firm* — SoraIP, Inc.

(57) ABSTRACT

The data updating method includes a step of acquiring part information of a part to be delivered, a step of acquiring part information of the part ordered from the ordering information database, a step of collating the part information of the part to be delivered with the part information of the part ordered, a step of acquiring new or change information of the part ordered from the design information database, a step of determining whether or not the packing style data of the part to be delivered is added or updated from the part information of the part ordered and the new or change information of the part ordered, and a step of adding or updating the packing style data of the part to be delivered when it is determined that the packing style data is added or updated.

9 Claims, 2 Drawing Sheets

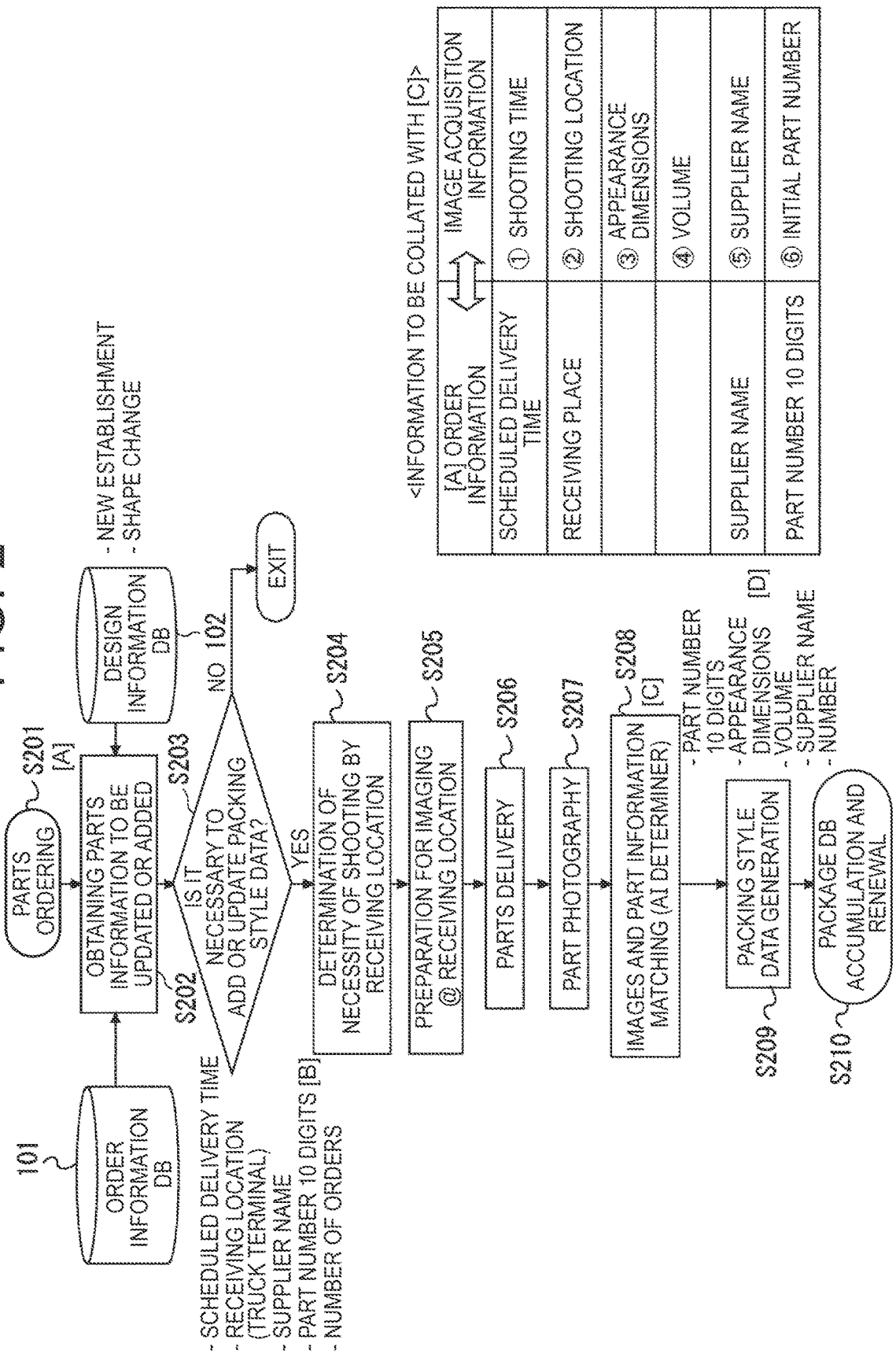

DATA UPDATING METHOD AND STORAGE MEDIUM

CROSS-REFERENCE TO RELATED APPLICATION

This application claims priority to Japanese Patent Application No. 2022-195452 filed on Dec. 7, 2022, incorporated herein by reference in its entirety.

BACKGROUND

1. Technical Field

The present disclosure relates to a data updating method and a storage medium.

2. Description of Related Art

In a prototype stage, a packing style of a prototype part needs to be registered in a database for an inventory management of a warehouse. However, the number and the shape of the prototype parts are not stable. In addition, the prototype parts have many new part numbers, and quoted data cannot be used. Further, since the prototype parts have a small number of production and a few flow opportunities, there is a problem that it is not easy to associate the prototype part with the part number even when the packing style information can be mechanically acquired.

Japanese Unexamined Patent Application Publication No. 5-40791 (JP 5-40791 A) describes a method for drastically reducing the time required for registering part information in a database. The part information is information of a part that supports production of a printed circuit board by an electronic part mounting machine. The part number and the corresponding part information are stored in a computer, and a program for analyzing product information is stored in the computer. The part number is read in step 1. A part type is determined in step 2. A shape and packing style information of the part are determined in step 3. It is determined whether the part information is already registered in a part database in step 4. When the part information is not registered, the part information is automatically registered in the part database in step 5.

SUMMARY

However, for the prototype part, there is a change in packing style due to a shape change by a design change, or according to the delivery number. Therefore, the part number and the packing style do not uniquely correspond to each other. Therefore, an object of the present disclosure is to provide a data updating method capable of appropriately storing a packing style in a database even for a prototype part.

A data updating method of the present disclosure includes a step of acquiring part information of a part to be delivered, a step of acquiring part information of a part ordered from an order information database, a step of collating the part information of the part to be delivered with the part information of the part ordered, a step of acquiring new or change information of the part ordered from a design information database, a step of determining whether packing style data of the part to be delivered is added to or updated from the part information of the part ordered and the new or change information of the part ordered, and a step of adding or updating, when the packing style data is determined to be added or updated, the packing style data of the part to be delivered.

By determining whether to add or update the packing style data of the part to be delivered from the part information of the ordered part and the new or change information of the ordered part, it is possible to provide a data updating method capable of appropriately storing the packing style in a database even for a prototype part.

In the data updating method of the present disclosure, the step of determining is executed after the step of acquiring the part information of the part ordered and the step of acquiring the new or change information of the part ordered and before the step of collating.

According to the above configuration, even when the order of the data updating method is changed, the packing style can be appropriately stored in the database.

In the data updating method of the present disclosure, the step of acquiring the part information of the part to be delivered is executed by inputting an image of the part to be delivered to a machine learning device that stores a plurality of images of the part to be delivered and identifying the part to be delivered.

According to the above configuration, it is possible to automatically identify the part to be delivered by using artificial intelligence (AI).

In the data updating method of the present disclosure, the step of collating is executed when a shooting time, a shooting location, a part number acquired by the machine learning device, and a supplier name of the part to be delivered correspond to a scheduled delivery time, an acceptance location, a part number, and a supplier name of the part ordered, respectively.

According to the above configuration, it is possible to associate the part to be delivered with the part ordered.

A storage medium of the present disclosure stores a program that causes an information processing apparatus to execute a step of acquiring part information of a part to be delivered, a step of acquiring part information of a part ordered from an order information database, a step of collating the part information of the part to be delivered with the part information of the part ordered, a step of acquiring new or change information of the part ordered from a design information database, a step of determining whether packing style data of the part to be delivered is added to or updated from the part information of the part ordered and the new or change information of the part ordered, and a step of adding or updating, when the packing style data is determined to be added or updated, the packing style data of the part to be delivered.

According to the above configuration, it is possible to provide a storage medium storing a program that causes the information processing apparatus to appropriately store the packing style in a database even for a prototype part.

According to the present disclosure, it is possible to provide a data updating method capable of appropriately storing a packing style in a database even for a prototype part.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flow chart of the data updating method according to a second embodiment.

DETAILED DESCRIPTION OF EMBODIMENTS

First Embodiment

Figure 1:
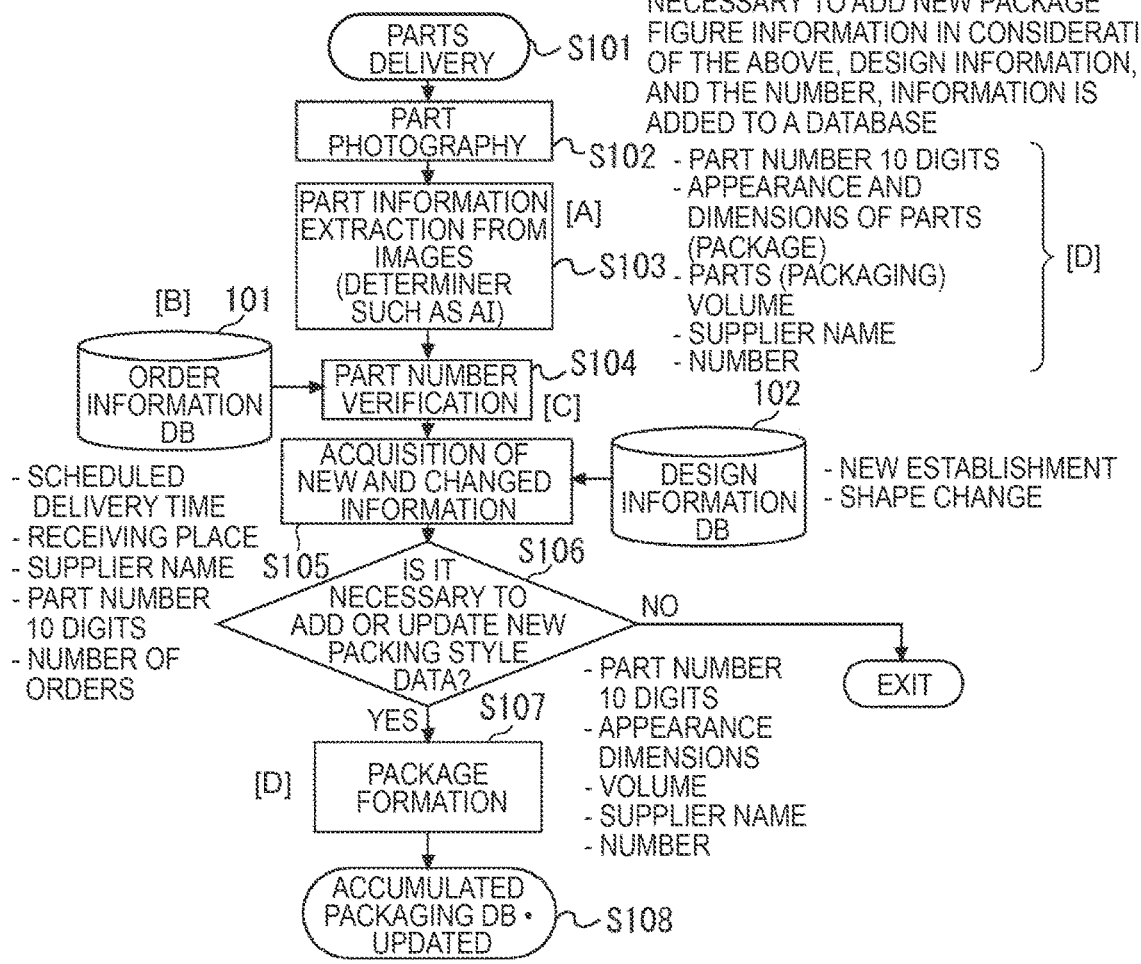
FIG. 1 is a flow chart of a data updating method according to a first embodiment.

Hereinafter, embodiments of the present disclosure will be described with reference to the drawings. However, the disclosure according to the claims is not limited to the following embodiments. Further, not all of the configurations described in the embodiments are essential as means for solving the problem. For clarity of explanation, the following description and the drawings are omitted and simplified as appropriate. In the drawings, the same elements are denoted by the same reference numerals, and redundant descriptions are omitted as necessary.

Description of Data Updating Method According to First Embodiment

FIG. 1 is a flowchart of a data updating method according to a first embodiment. Referring to FIG. 1, a data updating method according to Embodiment 1 will be described.

First, the part is delivered (S101). The component is a prototype component, i.e., a prototype component. The packing style of prototype parts changes according to the number. Also, in some cases, the same parts and numbers may change the packaging. A data updating method in which such components are appropriately registered in a database will be described.

The part is then S102. The photographing of the components is performed by a camera, such as a primary storage, which is taken out from a truck or the like and carried in. The parts will be sorted in the primary storage and placed in the warehouse's delivery location.

Next, components are extracted from the captured images (S103). The part information of the part to be delivered is acquired by AI. AI specifies a part to be delivered by inputting an image of a part to be delivered to a machine learning device that stores a plurality of images of a plurality of delivered components. The information of the parts to be delivered is, for example, 1 shooting time, 2 shooting location, 3 head part number 5 digits, 4 appearance dimensions, 5 volume, and 6 supplier names, as indicated by A. The shooting time is the time at which the image was shot. The shooting location is, for example, a place such as a primary storage room in which an image is taken. The initial part number 5 digit is a number indicating a product name of a gear, a wheel, or the like. Using AI, the first five digits of the part number representing the product name are estimated from the appearance of the delivered part. Appearance dimensions are the dimensions of the delivered part as can be seen from the appearance. Volume is the volume of the delivered part as seen from the appearance. The supplier name is the name of the company that purchased the parts to be delivered. Use AI to obtain the supplier name described in the container of the delivered part. If the supplier name is not listed in the container, the supplier name may not be obtained.

The part number is then checked (S104). First, part information of a part ordered from the order information database 101 is acquired. In the order information database 101, for example, i scheduled delivery time, ii acceptance location, iii part number of 10 digits, iv supplier name, and v order number of a part ordered as indicated by B are registered. The scheduled delivery time is a time at which the part ordered is delivered. The receiving location is the location of the primary repository that receives the part ordered. The part number 10 digit is a number indicating which prototype is used in addition to the item name. The supplier name is the name of the company that purchased the part ordered. The order number is the number of the parts ordered.

Then, the part information of the part to be delivered and the part information of the part ordered are checked. As indicated by C, for example, the photographed 1 shooting time, 2 shooting location, 3 head part number 5 digit, 6 supplier name of the part to be delivered, and i delivery time, ii receiving place, iii part number 10 digit, and iv supplier name of the part ordered correspond to each other. From the corresponding data, the order, the part number 10 digit of the delivered part, the appearance dimension, the volume, the supplier name, the number, and the like are acquired.

Next, the new creation/change data is acquired (S105). New or change information of a part ordered from the design information database 102 is acquired. In the design information database, new installation information indicating that the component is a new component and change information indicating that the shape of the component has been changed are registered.

Next, it is determined whether or not new addition/updating of the packing style data is required (S106). From the part information of the part ordered and the new or change information of the part ordered, it is determined whether or not the packing style data of the part to be delivered is added or updated. If not (for No of S106), the process ends.

If the part is new or has a change in shape and a new addition or updating of the packing style data is required (in Yes of S106), the packing style data is generated as indicated by D (S107). In addition to the captured package, the packing style data includes, for example, part number 10 digits, appearance size, volume, supplier name, number, and the like registered from the acquired delivery and order part data. Finally, the packing style data is stored and updated in the packing style database, and the process ends (S108).

As described above, by determining whether or not the packing style data of the part to be delivered is added or updated from the part information of the part ordered and the new or change information of the part ordered, it is possible to provide a data updating method capable of appropriately storing the packing style in the database even with the prototype component.

Description of Data Updating Method According to Second Embodiment

FIG. 2 is a flowchart of the data updating method according to the second embodiment. Referring to FIG. 2, a data updating method according to a second embodiment will be described.

The data updating method according to the second embodiment is different from the data updating method according to the first embodiment in that the step of determining is executed before the step of collating and after the step of acquiring the part information of the part ordered and the step of acquiring the new or change information of the part ordered.

First, a part is ordered (S201). Next, the part information to be updated and added is obtained (S202). The part information of the part ordered from the order information database 101 is acquired. The part information of the part ordered is, for example, a scheduled delivery time, an acceptance place, a supplier name, a part number 10 digit, and an ordered number as indicated by A. Next, new or change information of the part ordered is acquired from the design information database 102.

Next, it is determined whether or not addition/updating of the packing style data is required (S203). It is determined whether or not the packing style data of the part to be delivered from the part information of the part ordered and the new or change information of the ordered part is added or updated. If not required (No of S203), the process ends.

If the part ordered is new or has been changed in form, and the packing style data needs to be added or updated (in Yes of S203), the necessity of photographing for each receiving location is determined (S204). This is because there is a possibility that the photographing data may change at the receiving location. The camera is then ready for shooting at the receiving location (S205). Preparation for shooting is performed at the receiving location where shooting is required.

The part is then S206. Then, the delivered component is photographed (S207). The images and the part information are then S208. First, AI is used to acquire part information of a part to be delivered. As in the first embodiment, the part information of the part to be delivered is, for example, 1 shooting time, 2 shooting location, 3 head part number 5 digits, 4 appearance dimensions, 5 volume, and 6 supplier name. Next, the part information of the part to be delivered and the part information of the part ordered are checked. As indicated by C, the photographed 1 shooting time, 2 shooting location, 3 head part number 5 digit, 6 supplier name of the part to be delivered, i delivery time, ii receiving place, iii part number 10 digit, and iv supplier name of the part ordered correspond to each other.

The packing style data is then S209 as indicated by D. In addition to the captured packing style, the packing style data includes, for example, part number 10 digits, appearance size, volume, supplier name, number, and the like. Finally, the packing style data is stored and updated in the packing style database, and the process ends (S210).

Even if the order of the data updating method is changed in this way, the package is appropriately stored in the database.

The above-described data updating method can be executed using an information processing apparatus. The information processing apparatus may be one information processing apparatus or a plurality of information processing apparatuses. The information processing apparatus includes a processor (Central Processing Unit) (CPU) that executes a program to implement a process, and a memory that stores the program. The information processing apparatus may execute some or all of the functions in the cloud.

In addition, some or all of the processing in the above-described information processing apparatus can be realized as a computer program. Such programs may be stored and provided to a computer using various types of non-transitory computer-readable media. Non-transitory computer-readable media include various types of tangible recording media. Exemplary non-transitory computer-readable media include magnetic recording media (e.g., flexible disks, magnetic tapes, hard disk drives), magneto-optical recording media (e.g., magneto-optical disks), Read Only Memory (CD-ROM), CD-R, CD-R/W, solid-state memories (e.g., masking ROM, Programmable ROM (PROM), Erasable PROM (EPROM), flash ROM, Random Access Memory (RAM)). The program may also be supplied to the computer by various types of transitory computer readable media. Examples of the transitory computer-readable media include electrical signals, optical signals, and electromagnetic waves. The transitory computer-readable media can supply the program to the computer via a wired communication path such as an electric wire and an optical fiber, or a wireless communication path.

The present disclosure is not limited to the above embodiments, and can be appropriately modified without departing from the spirit thereof. For example, although the present disclosure has described a prototype component, it can be applied to a normal mass-produced product. Since it is determined whether or not the packing style data needs to be added or updated, the package form can be appropriately registered in the database even when there is a change in the package form in the same mass-produced product.

What is claimed is:

1. A data updating method of a packing style database in which part information is associated with a packing style comprising:
    acquiring first part information of a part to be delivered, the first part information being based on information of the part to be delivered that is detected by a sensor;
    acquiring second part information of a part ordered from an order information database;
    collating the first part information with the second part information;
    acquiring new information or change information of the part ordered from a design information database, the new information indicating that the part ordered is new, the change information indicating that shape of the part ordered has been changed;
    determining whether adding or updating packing style data of the part to be delivered in the packing style database is required based on the first part information and the new information or the change information of the part ordered; and
    adding or updating, in response to determining that adding or updating the packing style data is required, the packing style data of the part to be delivered in the packing style database by the information of the part to be delivered that is detected by the sensor.

2. The data updating method according to claim 1, wherein determining whether adding or updating packing style data of the part to be delivered in the packing style database is required is executed after acquiring the second part information acquiring the new information or the change information of the part ordered and before collating the first part information with the second part information.

3. The data updating method according to claim 1, wherein acquiring the first part information is executed by inputting an image of the part to be delivered to a machine learning device that stores a plurality of images of the part to be delivered and identifying the part to be delivered.

4. The data updating method according to claim 3, wherein collating is executed in a case where a shooting time, a shooting location, a part number acquired by the machine learning device, and a supplier name of the part to be delivered correspond to a scheduled delivery time, an acceptance location, a part number, and a supplier name of the part ordered, respectively.

5. A non-transitory storage medium storing a program that causes an information processing apparatus of a packing style database in which part information is associated with a packing style to execute:
    acquiring part first information of a part to be delivered, the first part information being based on information of the part to be delivered that is detected by a sensor;

acquiring second part information of a part ordered from an order information database;

collating the first part information with the second part information;

acquiring new information or change information of the part ordered from a design information database, the new information indicating that the part ordered is new, the change information indicating that shape of the part ordered has been changed;

determining whether adding or updating packing style data of the part to be delivered in the packing style database is required based on the first part information and the new information or the change information of the part ordered; and adding or updating, in response to determining that adding or updating the packing style data is required, the packing style data of the part to be delivered in the packing style database by the information of the part to be delivered that is detected by the sensor.

6. The data updating method according to claim 1, wherein:

the sensor is a camera; and acquiring the first part information is executed in response to determining that adding or updating the packing style data is required, the first part information being based on information of the part to be delivered that is captured by the camera.

7. The data updating method according to claim 1, wherein:

the sensor is a camera; and adding or updating the packing style data in response to determining that adding or updating the packing style data is required is executed by registering the packing style captured by the camera, the first part information, and the second part information.

8. The data updating method according to claim 1, wherein:

the sensor is a plurality of cameras provided on each of a plurality of acceptance locations, respectively; and the data updating method further includes determining whether capturing the packing style is required at each of the acceptance locations, and capturing the packing style at the acceptance location that is determined that capturing the packing style is required.

9. A data updating system of a packing style database in which part information is associated with a packing style comprising:

a sensor;

an order information database;

a design information database; and a processor configured to communicate with the sensor, the order information database, the design information database, acquire first part information of a part to be delivered, the first part information being based on information of the part to be delivered that is detected by the sensor, acquire second part information of a part ordered from the order information database, collate the first part information with the second part information, acquire new information or change information of the part ordered from the design information database, the new information indicating that the part ordered is new, the change information indicating that shape of the part ordered has been changed, determine whether adding or updating packing style data of the part to be delivered in the packing style database is required based on the first part information and the new information or the change information of the part ordered, and add or update, in response to determining that adding or updating the packing style data is required, the packing style data of the part to be delivered in the packing style database by the information of the part to be delivered that is detected by the sensor.

* * * * *